E. KALHAUS.
HEADLIGHT FOR MOTOR AND OTHER VEHICLES.
APPLICATION FILED SEPT. 29, 1913.

1,118,354.

Patented Nov. 24, 1914.
3 SHEETS—SHEET 1.

E. KALHAUS.
HEADLIGHT FOR MOTOR AND OTHER VEHICLES.
APPLICATION FILED SEPT. 29, 1913.
1,118,354.
Patented Nov. 24, 1914.
3 SHEETS—SHEET 2.
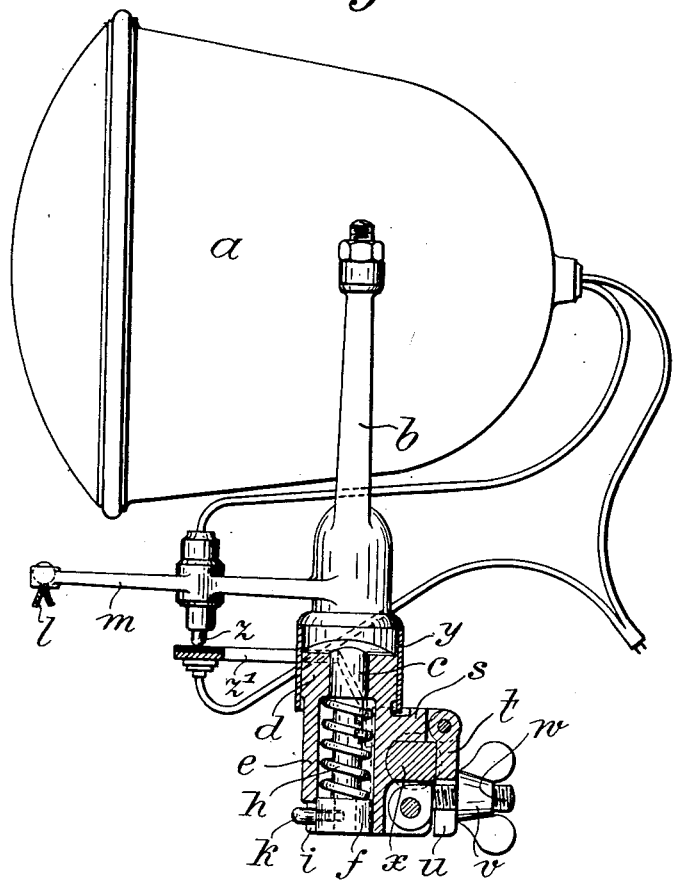
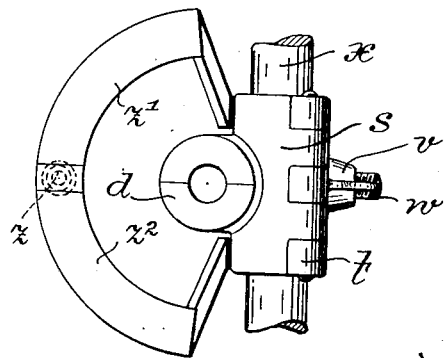

E. KALHAUS.
HEADLIGHT FOR MOTOR AND OTHER VEHICLES.
APPLICATION FILED SEPT. 29, 1913.
1,118,354.
Patented Nov. 24, 1914.
3 SHEETS—SHEET 3.
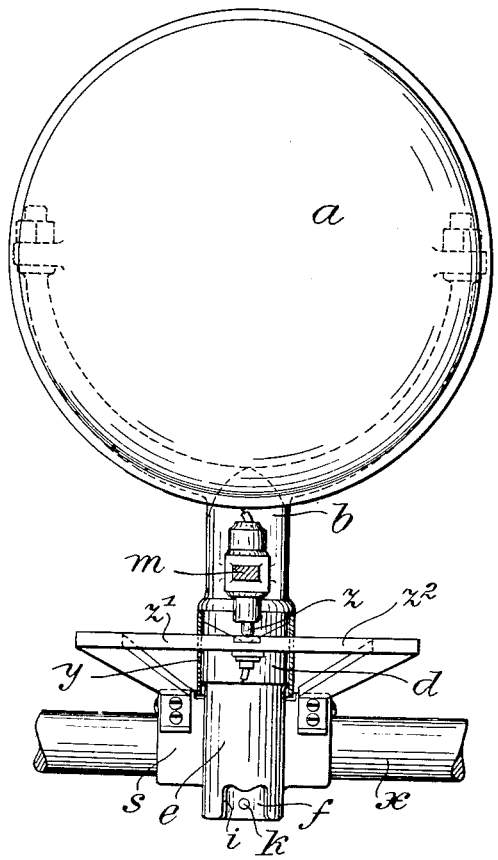
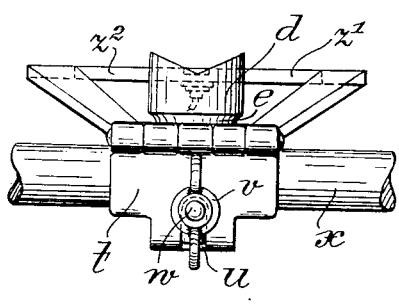

UNITED STATES PATENT OFFICE.

ERNST KALHAUS, OF VIENNA, AUSTRIA-HUNGARY, ASSIGNOR OF ONE-HALF TO JACQUES ELIAS, OF VIENNA, AUSTRIA-HUNGARY.

HEADLIGHT FOR MOTOR AND OTHER VEHICLES.

1,118,354.  Specification of Letters Patent.  Patented Nov. 24, 1914.

Application filed September 29, 1913. Serial No. 792,372.

*To all whom it may concern:*

Be it known that I, ERNST KALHAUS, subject of the Emperor of Germany, residing at Vienna, Austria-Hungary, have invented certain new and useful Improvements in Headlights for Motor and other Vehicles, of which the following is a specification.

My invention has for its object to provide an improved headlight for automobiles and other street vehicles, which, when the front wheels are steered to the right or to the left, is set automatically in the direction of the bend of the road in front, and thus illuminates said bend before the vehicle has arrived at the same.

The invention consists in the securing and adjustment of the members of the headlight, and in the formation of the casing in which the headlight support is mounted, whereby on the one hand it is possible to quickly secure the mounting casing on a front cross-bar of the vehicle, and on the other hand all adjusting members are protected against dirt and the like.

The invention further consists in a device for illuminating electrical headlights of the aforesaid kind only when the vehicle is approaching the bend of the road in front.

Figure 1:
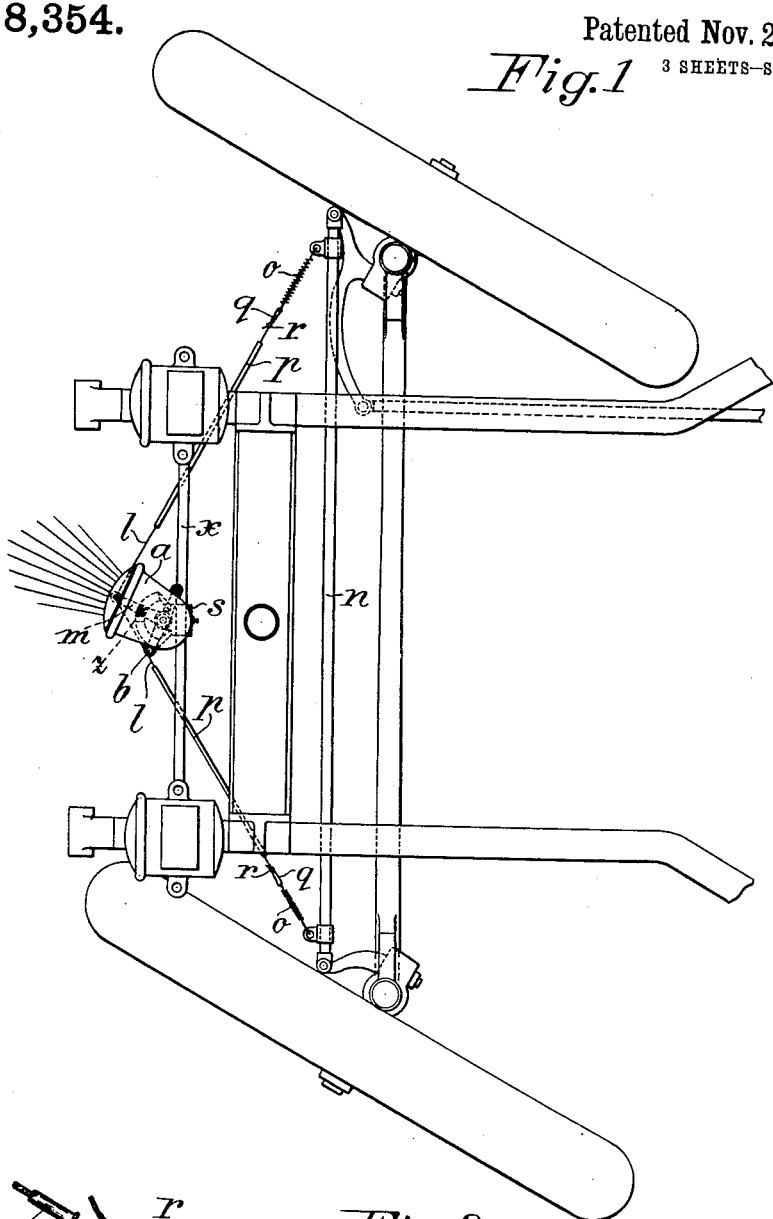
Figure 6:
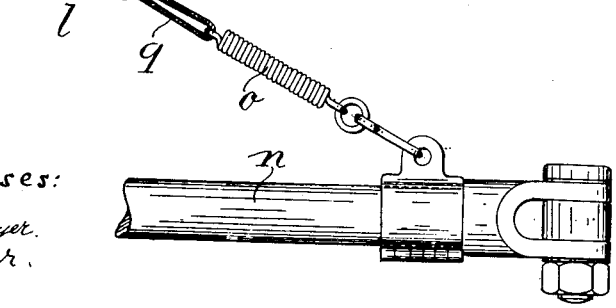

One construction of a headlight according to my invention is illustrated by way of example in the accompanying drawings in which:

Figure 1 is a plan of the arrangement of the headlight and its adjusting mechanism, on an automobile. Fig. 2 is a side elevation of the headlight, the supporting casing being shown in section. Fig. 3 is a front elevation of the headlight. Fig. 4 is a plan of the supporting casing secured to the cross-bar. Fig. 5 is a rear elevation of Fig. 3, and Fig. 6 shows the mode of connection of the cord serving for the displacement of the headlight to the connecting bar of the front wheels of the vehicle.

As shown by way of example the headlight $a$ is carried by a forked support $b$, whose shaft $c$ projects through an opening in the upper closing wall $d$ of an open-bottomed cylindrical supporting casing $e$. That part of the supporting fork which rests on the closing wall $d$ is wedge shaped, and rests normally in a wedge-shaped slot in the wall $d$. The shaft $c$ carries on its lower end a shoulder or collar $f$ which closes the lower opening of the supporting casing $e$. Between the wall $d$ of the casing $e$ and the shoulder $f$, is arranged a spring $h$ encircling the shaft $c$. This spring has a constant tendency to press the supporting fork $b$ together with its wedge-shaped part, into the wedge-shaped slot, whereby the supporting fork is prevented from shifting or rattling sidewise and is held in its normal position. In the lower end of the casing $e$ is a slot $i$, which is covered by the shoulder $f$. In the shoulder $f$ is screwed a fixing screw $k$ which projects outward beyond the slot $i$ and serves as a stop, which, when the fork $b$ turns to the right or left, comes in contact with the right or left hand wall of the slot and therefore limits the range of the horizontal turning movement of the headlight. The supporting fork is turned by means of cords $l$, secured at one end to an arm $m$ provided on the supporting fork, and at their other ends to the ends of the steering bar $n$ which connects together the front wheels of the vehicle.

The operation of the improved apparatus is as follows: When in steering the front wheels the steering bar $n$ is pushed sidewise, the supporting fork $b$ is rotated around its shaft $c$ by the pull on one of the cords $l$. The coöperating wedge surfaces then slide upon each other, whereby in consequence of the upward movement of the support $b$ the spring $h$ is tensioned. On steering again straight-ahead, the steering bar comes again into mid-position, and the spring $h$ brings the supporting fork again into its mid-position, whereby owing to the interlocking of the two wedge surfaces due to the action of the spring $h$, the headlight is prevented from rattling sidewise. The rotation of the headlight is, as already explained, limited by the stop $k$. In order however to allow of the requisite lengthening of the cord $l$, when the front wheels are turned beyond the limits of the maximum rotation of the headlight, tension springs, which of course must be more powerful than the returning spring $h$, are inserted in these cords. In order to protect the cords $l$, they may be inserted in flexible protecting tubes $p$. To facilitate the quick adjustment of the cords when mounting the headlight, or when the cords have stretched, one end of each cord is formed into an adjustable loop $q$ and this loop is secured by a clip $r$ or the like.

The casing *e* carries a U-shaped fixing clip *s* on which is secured a hinged locking cap *t* and also a fixing screw *w* provided with a wing nut *v*. The screw *w* passes through a slot *u* in the hinged cap *t*, so that after the stirrup *s* has been placed on a correspondingly flattened part of the crossbar *x*, the hinged cap can be closed and tightened by means of the screw *w* and wing nut *v*. The casing *e* is mounted immovably on the crossbar *x* by the stirrup *s* gripping the bar *x* on three sides, the hinged cap being pressed firmly against the fourth side. The said casing can also be mounted and dismounted very quickly. All moving parts are protected from dirt or the like. The body of the supporting fork carries a protecting sleeve *y* which grips the upper part of the mounting casing so that no dirt can enter also between the wedge surfaces.

It is advantageous only to illuminate the described headlight when entering a bend in the road, for instance by opening a normally closed dark shutter, or, when electrical headlights are used, by operating a switch placed within the reach of the driver.

In order to enable to automatically switch the current on and off in electrical headlights, to the headlight support *b*, is affixed a contact arm, preferably such as the oscillating arm *m*, carrying the insulated contact pin *z*. On either side of the arm *m* and of the contact pin *z* are arranged the contact arcs $z^1$ and $z^2$ over which the contact pin *z* is sliding whenever the headlight leaves its mid-position and is rotated to one side or to the other. Instead of the two contact arcs $z^1$ and $z^2$ which are affixed to and insulated from the stationary casing parts *s—e*, one single contact arc may be provided, in which case this contact arc carries in its middle an insulating plate in order to prevent the contact pin *z* from coming into electrical contact with the arc when the contact pin is in its mid position. The electrical circuit is led by means of suitable leads over the contact arc or as the case may be over the two contact arcs to the contact pin *z* and thence to the lamp of the projector.

As will be easily understood the lighting circuit is interrupted, when the headlight is standing in its mid-position, but as soon as the headlight is caused to leave its mid-position and is turned either to the right or to the left, the lighting circuit will be automatically closed and the headlight will be illuminated.

Claims:

1. In combination with the steering wheels of motor and other vehicles a headlight, a movable support for the same provided with a shaft, a casing adapted to receive said shaft, a collar on the lower end of said shaft to close the open bottom of said casing, a spring surrounding said shaft and bearing against said collar, an arm on said support, connections between said arm and the steering wheels, the upper closed end of said casing and the part of the support resting thereon having co-acting wedge-shaped portions causing said spring upon the turning of the support to be placed under tension thereby insuring the automatic return of the support to its original resting position, and a stop secured to said collar projecting through a slot in the lower end of said casing and adapted to engage the side walls of said slot, thereby limiting the range of turning movement of the support.

2. In combination with the steering wheels of motor and other vehicles a headlight, a movable support for the same provided with a shaft, a casing adapted to receive said shaft, a collar on the lower end of said shaft to close the open bottom of said casing, a spring surrounding said shaft and bearing against said collar, an arm on said support, connections between said arm and the steering wheels, the upper closed end of said casing and the part of the support resting thereon having co-acting wedge-shaped portions causing said spring upon the turning of the support to be placed under tension thereby insuring the automatic return of the support to its original resting position, a stop secured to said collar projecting through a slot in the lower end of said casing and adapted to engage the side walls of said slot, thereby limiting the range of turning movement of the support, and flexible means being arranged in the connections between the arm of the support and the steering wheels permitting the latter to turn farther than the maximum turning movement of the support.

3. In combination with the steering wheels of motor and other vehicles a headlight, a movable support for the same provided with a shaft, a casing adapted to receive said shaft, a collar on the lower end of said shaft to close the open bottom of said casing, a spring surrounding said shaft and bearing against said collar, an arm on said support, connections between said arm and the steering wheels, the upper closed end of said casing and the part of the support resting thereon having co-acting wedge-shaped portions causing said spring upon the turning of the support to be placed under tension, thereby insuring the automatic return of the support to its original resting position, and a protecting sleeve carried by said support and surrounding the upper part of the casing to prevent the access of dirt or dust to the co-acting wedge-shaped portions.

4. In combination with steering wheels of motor and other vehicles, a headlight, a movable support for the same provided with a shaft, a casing adapted to receive said shaft, a U-shaped securing clip arranged on said casing, a hinged locking cap secured to said securing clip, a screw passing through a slot in said hinged cap and a wing nut on said screw adapted to close the cap after the said clip has been mounted and for holding said cap in position.

In testimony whereof I have affixed my signature in presence of two witnesses.

ERNST KALHAUS.

Witnesses:
JOSEF RUBARD,
AUGUST FUGGER.